(12) United States Patent
Marvil et al.

(10) Patent No.: US 6,596,357 B1
(45) Date of Patent: *Jul. 22, 2003

(54) MULTILAYER FUSER ROLLS HAVING FLUOROPOLYMER COATING ON A COMPLIANT BASELAYER AND METHOD OF FORMING

(75) Inventors: Timothy D. Marvil, Sussex, NJ (US); Chris F. DelRosario, Demarest, NJ (US); Stace Moss, Falcon, CO (US); John Navarra, Boonton Township, NJ (US); Orville R. Raabe, Jr., Colorado Springs, CO (US)

(73) Assignees: Ames Rubber Corporation, Hamburg, NJ (US); Minco Manufacturing, Inc., Colorado Springs, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/600,844

(22) PCT Filed: Jan. 22, 1999

(86) PCT No.: PCT/US99/01238

§ 371 (c)(1),
(2), (4) Date: Oct. 12, 2000

(87) PCT Pub. No.: WO99/37468

PCT Pub. Date: Jul. 29, 1999

Related U.S. Application Data

(63) Continuation of application No. 09/012,522, filed on Jan. 23, 1998.

(51) Int. Cl.$^7$ .......................... B29D 23/00; B29D 24/00; B32B 1/08; B32B 1/10
(52) U.S. Cl. ................... 428/36.91; 428/36.91; 428/35.7; 264/331.14; 264/332.35
(58) Field of Search .................... 428/36.91, 35.7; 264/331.14, 332.35

(56) References Cited

U.S. PATENT DOCUMENTS

| | | | | |
|---|---|---|---|---|
| 3,435,500 A | * | 4/1969 | Aser ........................... 29/130 |
| 4,087,394 A | * | 5/1978 | Concannon ................. 260/29.6 |
| 4,139,576 A | * | 2/1979 | Yoshimura et al. ......... 260/857 |
| 4,789,565 A | * | 12/1988 | Kon et al. ................... 427/378 |
| 5,011,401 A | * | 4/1991 | Sakurai et al. ............... 432/60 |
| 5,035,950 A | * | 7/1991 | DelRosario ................. 428/421 |
| 5,153,660 A | * | 10/1992 | Goto ........................... 355/285 |
| 5,253,027 A | * | 10/1993 | Goto ........................... 355/290 |
| 5,474,850 A | | 12/1995 | DelRosario et al. |
| 5,547,759 A | * | 8/1996 | Chen et al. .................. 428/421 |
| 5,709,949 A | * | 1/1998 | Chen et al. .................. 428/421 |
| 5,998,034 A | * | 12/1999 | Marvil et al. ................ 428/422 |

FOREIGN PATENT DOCUMENTS

| EP | 0 321 162 A | | 6/1989 |
|---|---|---|---|
| EP | 0321162 A | * | 6/1989 |
| EP | 0 531 011 A | | 3/1993 |
| EP | 0531011 A | * | 3/1993 |
| EP | 0 763 568 A | | 3/1997 |
| EP | 763568 A | * | 3/1997 |
| JP | 2509544 | | 6/1996 |

OTHER PUBLICATIONS

Derwent Abstract: XP002101524 & JP 56 090862 A (Daikin Kogyo KK). Jul. 23, 1981.

* cited by examiner

Primary Examiner—Harold Pyon
Assistant Examiner—Marc Patterson
(74) Attorney, Agent, or Firm—Reed Smith LLP; Michael I. Wolfson

(57) ABSTRACT

A fuser member for fixing toner to a recording medium having a fluoropolymer non-stick topcoat on a compliant silicone rubber baselayer bonded to a metallic insert is provided. The fluoropolymer is adhered to the silicone rubber baselayer using a primer of a blend of silane and a polyamide resin. The primed silicone baselayer is preheated in an infrared oven to remove low molecular weight fractions. A primer is applied to the prebaked rubber and completely dried before applying the fluoroelastomer topcoat by spraying,

16 Claims, 1 Drawing Sheet

MULTILAYER FUSER ROLLS HAVING FLUOROPOLYMER COATING ON A COMPLIANT BASELAYER AND METHOD OF FORMING

This application is a continuation of Ser. No. 09/012,522 filed Jan. 23, 1998.

FIELD OF THE INVENTION

The invention relates to fusing members for use in photocopying and other printing operations which have a non-stick coating on a compliant baselayer, and more particularly to a multi-layer roll having a fluoropolymer coating bonded to a compliant silicone rubber layer on a metallic core.

BACKGROUND OF THE INVENTION

The use of a fusing member constructed with a non-stick material as a top layer and a heat resistant base layer has been known in the reprophotographic art. Typical non-stick materials which have been used include polytetrafluoroethylene (PTFE), fluorinated ethylene propylene (FEP), perfluoroalkoxy (PFA), polychlorotrifluoroethylene (PCTFE), ethylene-chlorotrifluoroethylene (ECTFE), ethylene-tetrafluoroethylene (ETFE), polyvinylidene fluoride (PVDF) and polyvinyl fluoride (PVF), silicone compounds and blends of these materials.

Fluoropolymer resin by itself, though an excellent non-stick material, provides no compliance. Silicone compounds on the other hand, while compliant are readily adversely affected by silicone oil which is commonly used as a release agent in fusing applications. As the silicone compound swells, the nip characteristics change, affecting the fuse quality of the images. The silicone coating becomes susceptible to mechanical damage, such as abrasion by the print media, picker fingers and hardened toner that accumulates in the system. Fluoroelastomers, on the other hand are tougher materials which are more resistant to silicone oil. However, fluoroelastomers generally require a special oil to function in a fuser application. These special silicone oils are costly and when present on the copy media make writing on the media noticeably more difficult.

It is preferable to have a material combining the non-stick properties of fluoropolymer resins and the compliant properties of silicone elastomers. U.S. Pat. No. 3,435,500 to Aser and U.S. Pat. No. 4,789,565 to Kon disclose applying a polytetrafluoroethylene resin to a silicone rubber surface which is adhered to a metal insert and sintering the resin. Another U.S. Pat. No. 5,547,759, to Chen, et al. discloses a method of bonding a fluoropolymer resin to various substrates including silicone, via a layer of fluoroelastomer and fluoropolymer containing a polyamide-imide layer. The fluoropolymer in the latter case assumes the role of an insulator to prevent degradation of the compliant substrate and the adhesion between the layers during the sintering process.

Since most commercially available materials today compromise one necessary property in some way or another, the various solutions suggested in the prior art are not fully satisfactory. This is particularly true in color systems where gloss and gloss maintenance is a key element of the fusing system. Here, a fluoropolymer coating possessing easy wettability by a silicone release agent is a highly desirable surface characteristic.

Accordingly, it remains highly desirable to provide a fuser member where the top layer provides maximum release properties and is not affected by the use of release agents commonly in use as well as possessing compliant properties.

SUMMARY OF INVENTION

Generally speaking, in accordance with the invention, a multilayer fuser roll construction having a compliant silicone baselayer bonded to a metallic core and a fluoropolymer coating bonded to the silicone layer is provided. This multilayer roll includes a primer layer of a blend of silicone and polyamide resin on the silicone baselayer which is pre-baked in an IR oven prior to disposing a PTFE primer thereon for bonding the fluorocarbon resin coating thereon.

Accordingly, it is an object of the invention to provide an improved multi-layer fuser roll having a non-stick coating on a compliant base layer adhered to a metallic core.

It is a further object of the invention to provide a multi-layer fuser roll having a fluoropolymer coating on a compliant base layer adhered to a metallic core.

It is another object of the invention to provide a multi-layer fuser roll having a fluoropolymer coating on a silicone rubber base coat adhered to a metallic core.

It is yet another object of the present invention to provide a novel primer composition for bonding a fluoropolymer coating to a compliant base layer adhered to a metallic core.

It is yet a further object of the invention to provide a method of fabricating a multi-layer fuser roll having a non-stick coating and a compliant base layer on a metallic core.

Still other objects and advantages of the invention will in part be obvious and will in part be apparent from the specification and drawings.

The invention accordingly comprises the several steps and the relation of one or more of such steps with respect to each of the others, and the composition possessing the features, properties and the relation of constituents and the article possessing the features, properties, and the relation of elements, which are all exemplified in the following detailed disclosure, and the scope of the invention will be indicated in the claims.

BRIEF DESCRIPTION OF THE DRAWINGS

For a fuller understanding of the invention, reference is had to the following description taken in connection with the accompanying drawings, in which.

DESCRIPTION OF THE PREFERRED EMBODIMENT

Figure 1:
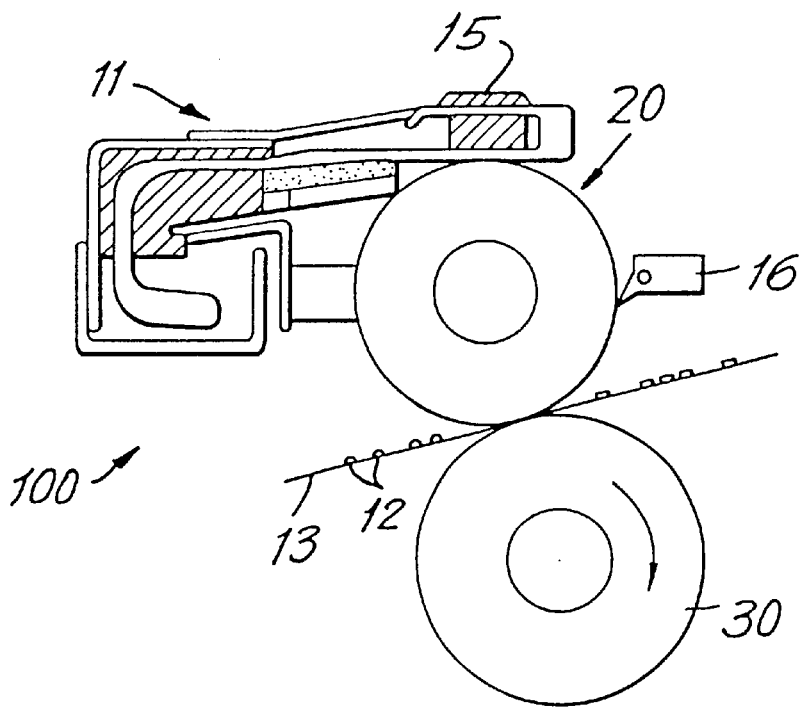
FIG. 1 is a schematic cross-sectional view of a fuser roll test assembly.

A fuser member prepared in accordance with the invention includes a metallic core with a compliant baselayer bonded thereto and a non-stick coating which is generally not compatible with the compliant baselayer. In the preferred embodiment, the fuser member has an aluminum core, a silicone rubber baselayer and an outer fluoropolymer coating. A primer layer of a blend of silane and polyamide resin is disposed on the silicone rubber baselayer which is prebaked in an IR oven prior to disposing the outer fluoropolymer coating thereon. The multi-layer fuser member made in accordance with the invention is fabricated by molding, grinding, pre-heat/sealing, application of top layers, sintering, and final polishing.

A fuser roll is fabricated by liquid injection molding a silicone compound onto an aluminum insert. Prior to the molding process, the aluminum insert is prepared by first cleaning the surface by degreasing and then a silicone rubber primer is applied by spraying. Typical silicone rubber primers for adhering to a metallic substrate are vinyltrimethoxysilane, gamma-methacyloxypropyltrimethoxy silane, vinyltris (T-butylperoxy) silane and partially hydrolyzed silane materials. Commercially available products of these materials include SS 4004 & 4155 from GE, DC 1200 & DC 6060 from Dow Corning, 790 from Wacker, Chemlok 608 & 607 and Thixon 5151. Chemlok is a tradename of Lord Corporation & Thixon is a tradename of Morton International Inc.

The injection molding process may be carried out using a 2 cavity mold connected to a liquid injection machine. The silicone rubber compound is initially cured in the mold for about 90 seconds at 204° C. (400° F.) and then post cured in an air circulating oven for 1 hour each at 93° C., 121° C., 149° C., 177° C., 204° C. and 232° C. (200° F., 250° F., 300° F., 350° F., 400° F. and 450° F.) Depending on the material and thickness, post curing can also be conducted in a vacuum oven.

The post cured silicone baselayer of each roll is then ground to the desired finished diameter and roughness. The thickness of the silicone coating applied can range anywhere from about 0.25 to 10.00 mm, and preferably between 2 to 7 mm. The surface finish of the ground silicone should be no rougher than about 40 Ra.

The ground sample is then subjected to another cleaning process to remove any dust particles on the surface followed by an aqueous washing operation. The cleaned roll is then sprayed with a primer which is a blend of silane and a polyamide resin. The silane component of the blend can be made from the same silanes as used to adhere the silicone to the metal substrate. These silanes include vinyltrimethoxysilane, gamma-methacryloxypropytri-methyxysilane, 3-glycidoxyproplytrimethoxy silane. The polyamide resin dispersed therein is preferably selected from the group comprising Versamid 100, Micromid 632 HPL, Micromid 141L, Versamid 100X65 and Versamid 100T60. Versamid and Micromid are trademarks of Henkel Corporation and Union Camp Corporation, respectively.

An important step in the process of fabricating the multi-layer roll in accordance with the invention is a pre-baking operation prior to deposition of the non-stick coating. The preferred silicone compound baselayer used are those based on addition cured systems where no reaction by-product is generated during the curing cycle. However, since most silicone compounds contain minor amounts of low molecular weight cyclic fractions, the pre-bake step of the process removes any low molecular weight fraction while at the same time transforming the primer layer into an oxidized state. This renders the surface easily wettable by the top layer primer and making it susceptible to receive the op layer chemistry.

The IR oven used to pre-bake the primed silicone rubber is about 4.7 meters (12 feet) long. The oven speed can be varied from about 20 mm per minute (mm/m) (8 inches per minute (ipm)) to 59 mm/m (22 ipm). The IR oven is capable of heating the roll surface from room temperature to about 425° C. (800° F.) in about 10 to 12 minutes.

In the pre-baking step, the roll is heated during the initial 2 meters (8 feet) of travel through the oven to about 260° C. (500° F.). The roll is then permitted to dwell at that temperature for the remaining 1.3 meter (4 feet) of travel through the oven.

It has been found that if the roll during the pre-baking step is underbaked, gas is entrapped in the silicone base layer. This prevents adequate bonding of the fluoroelastomer topcoat. If the roll is overbaked, there is the potential of damage to the primer layer and damage to the silicone layer.

After the pre-baking step, the roll is allowed to cool. At this time, a final primer is applied prior to application of the fluoropolymer coating. The final primer is one usually used to adhere polytetrafluoroethylene coatings as suggested by the manufacturer. Such primers usually contain PTFE and fluorinated ethylene propylene resin with polyamide or polyamide-imide polymers. A preferred primer includes the polyamide-imide polymer.

The fluoropolymer material for the coating is applied to the primed prebaked silicone rubber surface of the roll using spray equipment in two steps. There is a mid-coat and a top-coat as suggested by the manufacturer. The roll is weighed and the coating is applied to generate a final coating thickness of about 2.5 to 6.5 micron (0.7–1.6 mils) coating thickness. The coated roll is then re-weighed. For each type of roll, there is a weight target for each coating layer. The topcoat primer layer must be completely dry before the mid and topcoat layers are applied. The midcoat must be wet when the topcoat is applied.

After spraying, the liquid-coated roll is cured using an infrared oven. The upper limit of the cure temperature is determined by the temperature at which the silicone rubber and/or primer layer begins to break down. Though experimentation, this temperature has been determined though it is variable depending on the construction of the roll. For thicker walled rolls the maximum temperature is about 393° C. (740° F.). For thinner walled rolls the maximum temperature is about 371° C. (700° F.). There are several indications of an overcured roll so that this can be monitored during the processing. The most prominent indication is the color of the cured material.

Rolls prepared in accordance with the invention have been cured at both the maximum and minimum rates through the oven. Based on the foregoing rates, the maximum IR oven time exposure is about 18 minutes. The roll itself does not get above about 204° C. (400° F.) in the first third of the oven. Therefore, the maximum time these rolls are in the IR oven above the temperature where silicone rubber degrades is about 12 minutes. On the other hand, the minimum time is about 4 minutes. Both of these exposure times are considered acceptable.

After completion of the cure, the roll is polished using a superfinishing process, then inspected and packaged. The superfinishing process is presently used throughout the industry as a polishing process, and is well known to those skilled in the art. The cured and coated fuser roll is then ready for testing in a test apparatus as shown in FIG. 1.

A fuser roll test assembly 100 is shown generally in FIG. 1 and applies heat and pressure to fuse a quantity of toner particles 12 on a sheet of paper 13 between a fuser roll 20 and a pressure roll 30. Fuser roll test assembly 100 also includes a release agent application unit 11 including a wick 15 for applying release agent to the surface of fuser roll 20. A stripper finger 16 facilitates the separation of paper 13 from roll 20 as it travels in the direction of arrow A.

Figure 2:
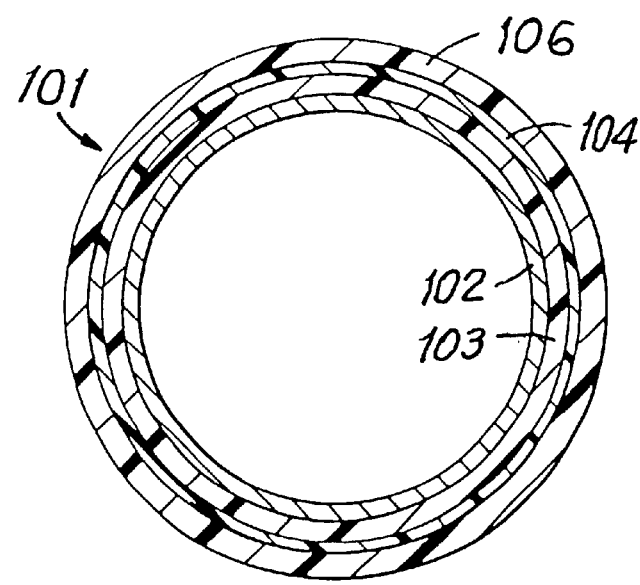
FIG. 2 is a schematic cross-sectional view of a fuser roll constructed and arranged in accordance with the invention showing the multilayer construction.

In FIG. 2, a fuser roll 101 constructed and arranged in accordance with the invention is shown. Fuser roll 101 includes a solid or hollow core or insert 102 covered with a baselayer 102 having a primer layer 104 disposed thereon and a topcoat 106 disposed on primer layer 103. Baselayer 102 is preferably 0.5 to 5 mil thick and the overall coating (either surface layer 104 or combined layers 102, 103 and 104) should be about 0.1 to 0.3 microns (3–8 mils) thick.

The following Examples describe the multi-layer fuser rolls having fluoroelastomer topcoats on a silicone baselayer prepared in accordance with the invention. These examples are presented for purposes of illustration only, and are not intended to be construed in a limiting sense.

EXAMPLES 1–6

Tables I and II provide a summary of the results obtained using various combinations of components coming within the scope of the invention. Table I shows the results using different PTFE primers and topcoat compositions on the silicone rubber baselayer.

TABLE I

| Coating Number | * Primer | ** Midcoat | *** Topcoat | Conductive | Comments |
|---|---|---|---|---|---|
| 1 | Conductive Primer-A | PFA/PTFE Conductive Mid Coat-A | PFA/PTFE Conductive Top Coat-A | Yes | First tested technology |
| 2 | Conductive Primer-B | | PFA/PTFE Conductive Top Coat-B | Yes | Mainline development difficult to polish |
| 3 | Non-Conductive Primer-C | PFA/PTFE Non-Conductive Mid Coat-C | PFA/PTFE Non-Conductive Top Coat-C | No | Second mainline development. Visual problems with roller during life testing. |
| 4 | Non-Conductive Primer-C | PFA/PTFE Non-Conductive Mid Coat-C | PFA Non-Conductive Top Coat-D | No | Alternative to #3 difficult to polish. |
| 5 | Non-Conductive Primer-C | PFA/PTFE Non-Conductive Mid Coat-D | PFA/PTFE Non-Conductive Top Coat-C | No | Current development reduced to production coating. |

| * | Primer | Designation | Polymer Ingredients |
|---|---|---|---|
| | A | DuPont 855-023 | PTFE, FEP Resin, Polyamide Polymer |
| | B | DuPont 855-024 | PTFE, FEP Resin, Polyamide-imide polymer PFA Resin |
| | C | DuPont 855-021 | PTFE, FEP Resin, Polyamide-imide polymer |
| ** | Mid Coat | Designation | Polymer Ingredients |
| | A | DuPont 855-421 | PTFE, PFE-PFAVE Polymer, Acrylic polymer |
| | C | DuPont 855-401 | PTFE, Acrylic Polymer |
| | D | DuPont 855-403 | PTFE, FFA Resin, Acrylic Polymer |
| *** | Top Coat | Designation | Polymer Ingredients |
| | A | DuPont 855-103 | PTFE, Acrylic Polymer |
| | B | DuPont 855-107 | PFE-PFAVE Polymer, TFE/PFVE |
| | C | DuPont 855-500 | PTFE, Acrylic Polymer |
| | D | DuPont 855-210 | PTFE |

Table II sets forth the results demonstrating the improved bonding levels between the fluoroelastomer coating and the silicone rubber baselayer in accordance with the invention. Run 1 utilizes a Vistamer high density polyethylene from Composite Particles, Inc. dispersed in a Thixon silane often used as a silicone rubberprimner material. The bond level of 0–2 is poor and not acceptable. A bond level of 8–10 is fully acceptable.

TABLE II

| | 1 | 2 | 3 | 4 | 5 | 6 |
|---|---|---|---|---|---|---|
| Thixon 300/301 | 100.0 | X | X | X | X | X |
| Chemlok 5151 | X | 100.0 | X | 50.0 | 100.0 | 50.0 |
| Chemlok 607 | X | X | 100.0 | 50.0 | X | 50.0 |
| Vistamer HDPE | 10.0 | X | X | X | X | X |
| Micromid 632 HDL | X | 8.0 | X | 8.0 | X | X |

TABLE II-continued

| | 1 | 2 | 3 | 4 | 5 | 6 |
|---|---|---|---|---|---|---|
| Versamid 100 | X | X | 8.0 | X | 8.0 | 8.0 |
| Bond Level | 0–2 | 8–10 | 4–5 | 6–8 | 8–10 | 6–8 |

0 - Poor Bond
10 - Excellent Bond

A marginally acceptable bond level of 4–5 is obtained when Versamid 100 is dispersed in Chemlock 607. Similar but somewhat better results are obtained when Versamid 100 or Micromid 632 HDL are dispersed in mixtures of Chemlock 5151 and Chemlock 607. The most acceptable and highest bond levels are achieved when the Micromid or Versamid are dispersed in Chemlock 5151.

The improved bond level between the fluoropolymer coating and the silicone rubber baselayer is evidenced by the performance of rolls prepared in accordance with the invention. It is characteristic of such rolls not to delaminate during failure. Typically, a line forms at the picker finger which will indicate a deterioration in copy quality, but the copier will still make copies. This is due to the higher peel strength of the fluoroelastomer topcoat utilizing the unique primer systems in accordance with the invention.

Peel strength is defined as the force required to remove the fluoropolymer coating from the silicone baselayer. The test measures the force in grams necessary to remove a 10 mm wide strip which is pulled at a 90° angle to the part at a rate of 200 mm/min.

The peel strength for typical original equipment manufactured parts is between about 20–50 grams. In contrast, in the multi-layer rolls prepared in accordance with the invention the typical peel strength is between about 100–250 grams. It is noted that this is a significant measurement since the coating for OEM parts typically fail by peeling off in sheets. This potentially causes the copiers to stop once the paper paths become plugged with strips of coating. As noted above, the multilayer rolls prepared in accordance with the invention typically show wear in specific areas, but generally do not peel off in sheets due to the significantly higher peel strength obtained by the invention.

It will thus be seen that the objects set forth above, among those made apparent from the preceding description, are efficiently attained and, since certain changes may be made in carrying out the above method, and in the composition and article set forth without departing from the spirit and scope of the invention, it is intended that all matter contained in the above description and shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

Particularly it is to be understood that in said claims, ingredients or compounds recited in the singular are intended to include compatible mixtures of such ingredients wherever the sense permits.

What is claimed is:

1. A method of forming a fuser member, comprising:

providing a substrate;

depositing a silicone rubber primer on the substrate;

placing the primed substrate into an injection molding machine;

injecting a silicone rubber compound about the primed substrate to form a baselayer;

curing the silicone rubber baselayer;

cleaning the silicone rubber baselayer;

applying a primer of a blend of silane and polyamide resin that adheres to the silicone rubber baselayer;

pre-baking the silicone rubber baselayer;

applying a fluoropolymer primer that adheres to the pre-baked silicone baselayer;

spraying a fluoropolymer topcoat onto the primed and pre-baked silicone rubber surface; and curing the coated substrate.

2. The method of forming a fuser member of claim 1, wherein the pre-baking is carried out in an infrared oven.

3. The method of forming a fuser member of claim 2, wherein the infrared oven is an elongated apparatus and the fuser member is transported through the oven at a controlled rate of speed.

4. The method of forming a fuser member of claim 3, wherein the silicone rubber coated substrate is heated to about 260° C. (500° F.).

5. The method of forming a fuser member of claim 4, wherein the pre-baked silicone rubber coated substrate is cooled prior to application of fluoroelastomer primer.

6. The method of forming a fuser member of claim 1, wherein the fluoropolymercoating is cured in an infrared oven.

7. A fuser member, comprising:

a substrate;

a silicone rubber primer layer disposed on the substrate;

a silicone rubber baselayer disposed on the primer layer;

a pre-baked silane and polyamide primer layer disposed on the silicone rubber baselayer;

a fluoropolymer primer layer disposed on the pre-baked and primed silicone baselayer; and a top coat of a fluoropolymer disposed on the silicone baselayer.

8. The fuser member of claim 7, wherein the substrate is a metallic substrate.

9. The fuser member of claim 7, wherein the substrate is a metallic roll.

10. The fuser member of claim 7, wherein the fluoropolymer coating includes a fluoroelastomer midcoat of polytetrafluoroethylene and a top coat of polytetrafluoroethylene and perfluoroalkoxy having a major proportion of polytetrafluoroethylene perfluoroalkoxy.

11. The fuser member of claim 10, wherein the fluoropolymer mid coat includes between about 30 to 70 weight percent polytetrafluoroethylene and the top coat includes at least about 70 weight percent polytetrafluoroethylene.

12. The fuser member of claim 11, further including a polytetrafluoropolymer primer deposited on the pre-baked silane and polyamide prime layer.

13. The fuser member of claim 12, wherein the fluoropolymer mid coat includes about 50 weight percent polytetrafluoroethylene and 50 weight percent perfluoroalkoxy and the top coat includes about 90 weight percent polytetrafluoroethylene and 10 weight percent polytetrafluoroethylene.

14. The fuser member of claim 13, wherein the polytetrafluoroethylene primer is an aqueous based suspension of polytetrafluoroethylene, fluorinated ethylene propylene resin and polyamide-imide polymer.

15. The fuser member of claim 7, wherein the fluoropolymer primer layer disposed on the pre-baked primed silicone baselayer is a polyamide-imide fluoropolymer primer.

16. The fuser member of claim 15, wherein the fluoropolymer coating includes a fluoropolymer midcoat of polytetrafluoroethylene and perfluoroalkoxy and a top coat of polytetrafluoroethylene and perfluoroalkoxy having a major proportion of polytetrafluoroethylene.

* * * * *